United States Patent
Saad et al.

(10) Patent No.: US 10,063,463 B2
(45) Date of Patent: Aug. 28, 2018

(54) NODE PROTECTION FOR SEGMENT ROUTING ADJACENCY SEGMENTS

(71) Applicant: Cisco Technology, Inc., San Jose, CA (US)

(72) Inventors: Tarek Saad, Napean (CA); Muthurajah Sivabalan, Kanata (CA); Show Chung Chin, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 383 days.

(21) Appl. No.: 14/571,848

(22) Filed: Dec. 16, 2014

(65) Prior Publication Data

US 2016/0173366 A1   Jun. 16, 2016

(51) Int. Cl.
*H04L 12/707*   (2013.01)
*H04L 12/733*   (2013.01)
*H04L 12/723*   (2013.01)
*H04L 12/703*   (2013.01)

(52) U.S. Cl.
CPC .............. *H04L 45/22* (2013.01); *H04L 45/20* (2013.01); *H04L 45/28* (2013.01); *H04L 45/50* (2013.01)

(58) Field of Classification Search
CPC ......... H04L 45/50; H04L 45/28; H04L 45/04; H04L 45/22; H04L 45/02; H04L 45/507; H04L 45/745; H04L 45/42; H04L 45/00; H04L 45/12; H04L 45/24; H04L 45/20; H04L 45/122; H04L 47/125
See application file for complete search history.

(56) References Cited

U.S. PATENT DOCUMENTS

| 8,081,563 | B2 * | 12/2011 | Guichard | H04L 1/22 370/217 |
| 2005/0207337 | A1 * | 9/2005 | Oda | H04L 45/10 370/214 |
| 2008/0170493 | A1 * | 7/2008 | Vasseur | H04L 45/00 370/217 |
| 2008/0205272 | A1 * | 8/2008 | Vasseur | H04L 12/4633 370/235 |

(Continued)

OTHER PUBLICATIONS

Francois et al., "Topology Independent Fast Reroute using Segment Routing", Network Working Group Internet-Draft, <draft-francois-segment-routing-ti-lfa-00>, Nov. 18, 2013, 10 pages, Internet Engineering Task Force Trust.

(Continued)

*Primary Examiner* — Peter Chen
(74) *Attorney, Agent, or Firm* — Parker Ibrahim & Berg LLP; James M. Behmke; Stephen D. LeBarron

(57) ABSTRACT

In one embodiment, a device in a segment routed network identifies an adjacency segment between the device and another device in the network. The device also identifies a merge point in the network. A first network path extends between the device and the merge point via the adjacency segment. A bypass network path that does not include the adjacency segment also extends between the device and the merge point. The device generates an interior gateway protocol (IGP) message that identifies the adjacency segment and the merge point. The device provides the IGP message to one or more other devices in the network.

15 Claims, 16 Drawing Sheets

(56) References Cited

U.S. PATENT DOCUMENTS

| | | | | |
|---|---|---|---|---|
| 2009/0316570 A1* | 12/2009 | Bell | ........................ | H04L 45/04 370/218 |
| 2011/0080836 A1* | 4/2011 | Bragg | .................... | H04L 12/413 370/241.1 |
| 2011/0280123 A1* | 11/2011 | Wijnands | .............. | H04L 45/507 370/228 |
| 2014/0177638 A1* | 6/2014 | Bragg | ..................... | H04L 45/50 370/395.5 |
| 2015/0281045 A1* | 10/2015 | Torvi | ..................... | H04L 45/28 370/228 |
| 2016/0119821 A1* | 4/2016 | Ramachandran | ....... | H04L 45/28 370/392 |

OTHER PUBLICATIONS

Previdi et al., "Segment Routing with IS-IS Routing Protocol", IS-IS for IP Internets Internet-Draft, <draft-previdi-filsfils-isis-segment-routing-02>, Sep. 21, 2013, 27 pages, Internet Engineering Task Force Trust.

* cited by examiner

NODE PROTECTION FOR SEGMENT ROUTING ADJACENCY SEGMENTS

TECHNICAL FIELD

The present disclosure relates generally to computer networks, and, more particularly, to protecting adjacency segments in a segment routed network from node failures.

BACKGROUND

Multiprotocol label switching (MPLS) is a packet switching technology that allows routing decisions to be based on labels that are appended to the headers of packets. Such a label represents a path in the network and is used to make forwarding decisions until the corresponding packet reaches its destination. Once the packet reaches its destination, the destination device may "pop" (e.g., remove) the corresponding label from the header of the packet and/or apply another label to the packet, to continue routing the packet throughout the network.

Segment routing is a routing technology that may be used in conjunction with MPLS. For example, MPLS labels may be carried in routing protocol messages to enable segment routing in the network. Segment routing defines two forms of segments: adjacency segments and node segments. In general, adjacency segments correspond to a specific adjacency/interface of a given node. In contrast, node segments are more global in nature and represent the shortest path to a node. Notably, the target node of a node segment may be assigned a unique identifier used within the network. Thus, a label switched path (LSP) may be formed by concatenating any number of adjacency and/or prefix segments. When a device along an LSP receives a packet that has a segment as the top label, that label may be reused by any number of intermediary devices to route the packet to the target node associated with the segment. For example, assume that a path exists from nodes A→B→C→D. If node A receives a packet having a top label/node segment associated with node D, it may swap the label with itself and forward the packet to node B. Node B may perform a similar operation and forward the packet on to node C. Node C may then pop the label off of the stack and forward the packet with any remaining labels to node D.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a segment routed network identifies an adjacency segment between the device and another device in the network. The device also identifies a merge point in the network. A first network path extends between the device and the merge point via the adjacency segment. A bypass network path that does not include the adjacency segment also extends between the device and the merge point. The device generates an interior gateway protocol (IGP) message that identifies the adjacency segment and the merge point. The device provides the IGP message to one or more other devices in the network.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
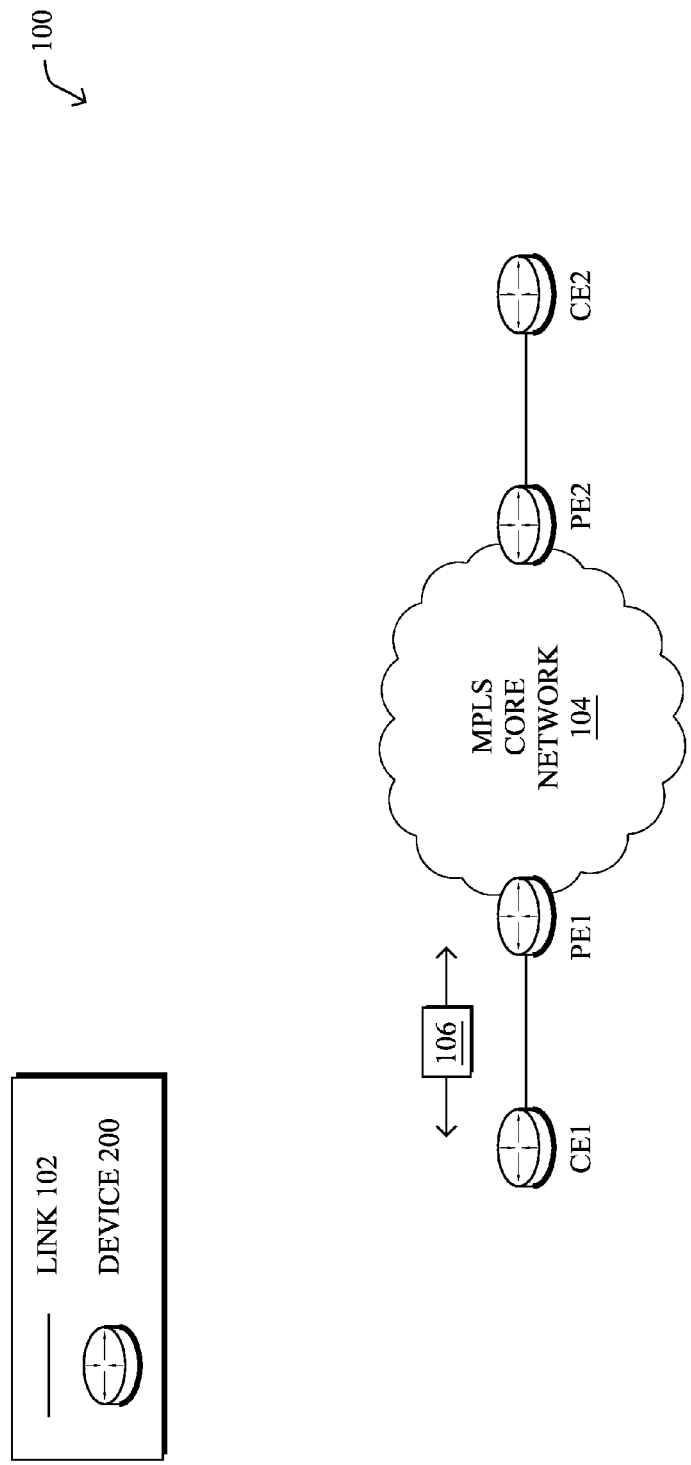
FIG. 1 illustrates an example communication network.

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network, such as an illustrative Multi-Protocol Label Switching (MPLS) core network 104. Data packets 106 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 2:
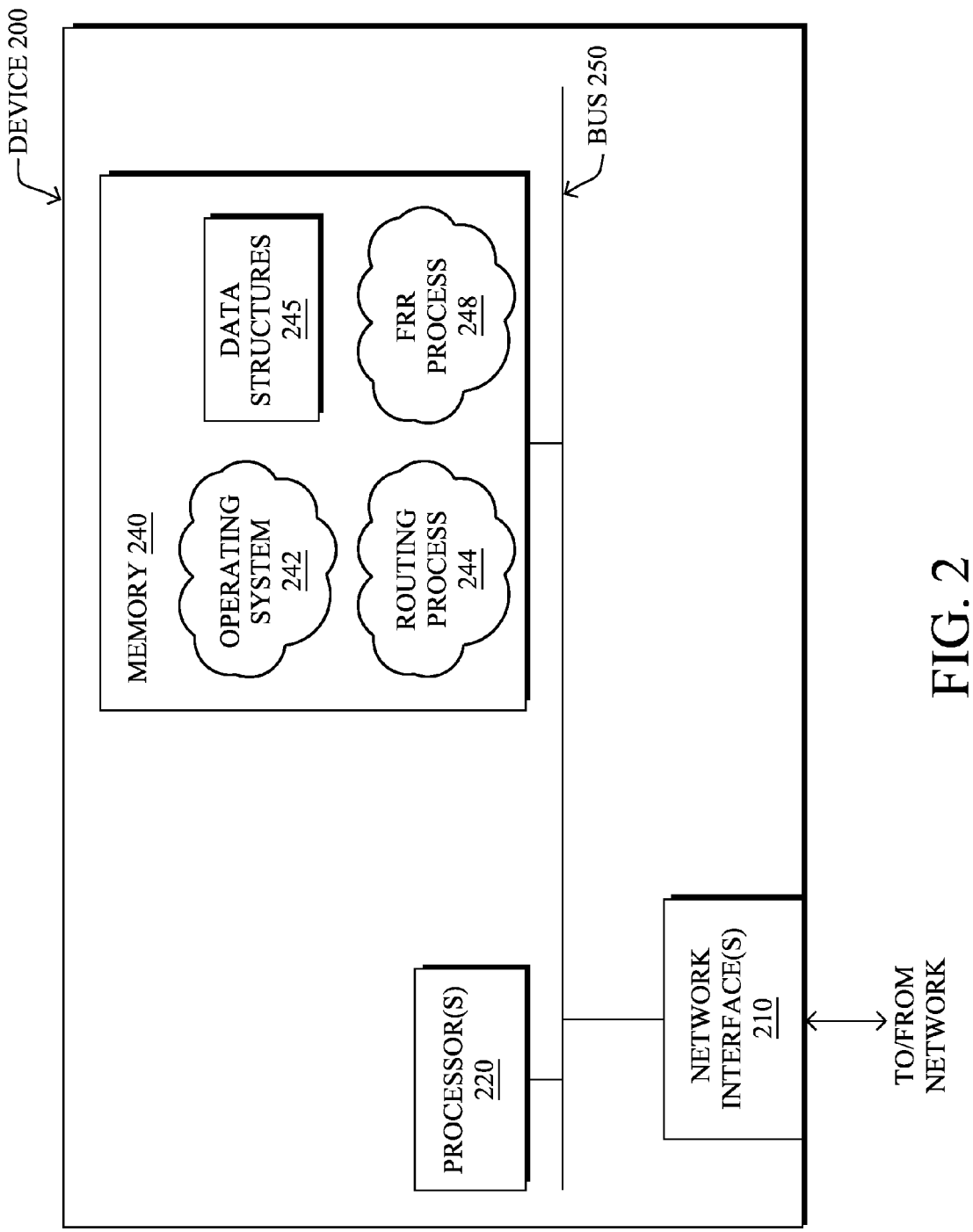
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may include a routing process 244 and/or a fast reroute (FRR) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP) (e.g., in conjunction with FRR process 248), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

In various embodiments, routing process 244 may be configured to perform segment routing in the network, such as, e.g., in conjunction with MPLS. For example, routing process 244 may utilize extensions to the IGP (e.g., IS-IS, OSPF, etc.), that allow IGP messages to carry MPLS label information, to enable segment routing. As noted previously, segments in a segment routed network may fall into one of two categories: node segments and adjacency segments. Adjacency segments generally represent the local interface between a given node and an adjacent neighbor. Notably, adjacency segments do not need to be unique among the different nodes, as adjacency segments only require local significance to the particular node. Node segments, in contrast, are global in nature and use unique identifiers to represent node segment endpoints. When used in conjunction with MPLS, segments (e.g., node and adjacency segments) may be treated as labels, whereby a node may either "push" a new segment/label onto the stack, "pop" (e.g., remove) the top segment/label from the stack, or "swap" the top label of the stack with another label.

Fast rerouting (FRR) is an MPLS mechanism that allows a network to adapt quickly to a link or node failure. In particular, FRR allows a network node, referred to as a point of local repair, to detect a routing failure and quickly adapt routing decisions to avoid the point of failure in the network. Routing failures may fall under one of two categories: link failures and node failures. In general, link and node failures differ in that other links may still be available to a given node if one of the links to the node fails, whereas no links to the node would be available if the node itself fails.

Thus far, attempts to enable FRR for use with segment routing have focused on protecting node segments. For example, the Internet Engineering Task Force (IETF) Internet-Draft <draft-francois-segment-routing-ti-lfa-00> entitled "Topology Independent Fast Reroute Using Segment Routing" by Francois et al. (Nov. 18, 2013), which is hereby incorporated by reference, proposes FRR mechanisms that protect against both link and node failures when the active segment is a node segment. However, providing FRR protection against a node failure when the active segment is an adjacency segment still remains challenging and difficult.

The techniques herein provide a method that allows traffic traversing a segment routing adjacency segment to be protected against the failure of the downstream node. In one aspect, extensions are introduced that allow information regarding node-protection for an adjacency segment (e.g., a merge point address, an identifier to signify protection, etc.) to be carried within an IGP message. In another aspect, a path computation engine (PCE) or segment routing tunnel head-end may select the strict path segments (e.g., the set of adjacency and node segments of a path) that can provide downstream note protection along the path. In a further aspect, any node may act as a point of local repair to protect an active adjacency segment against downstream node failure. In yet another aspect, a PCE, or a head-end device of a segment routing tunnel, may identify the specific adjacency segments that are to be protected against downstream node failure. As would be appreciated, the techniques herein may reduce the amount of processing and inspection at a point of local recovery (e.g., a device executing FRR process 248) after a failure, by proactively pre-computing and pre-programming the backup path(s) for the different merge points (e.g., downstream nodes of the protected node).

Specifically, according to one or more embodiments of the disclosure as described in detail below, a device in a segment routed network identifies an adjacency segment between the device and another device in the network. The device also identifies a merge point in the network. A first network path extends between the device and the merge point via the adjacency segment. A bypass network path that does not include the adjacency segment also extends between the device and the merge point. The device generates an interior gateway protocol (IGP) message that identifies the adjacency segment and the merge point. The device provides the IGP message to one or more other devices in the network.

Illustratively, the techniques described herein may be performed by hardware, software, and/or firmware, such as in accordance with the FRR process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, and as such, may be processed by similar components understood in the art that execute those protocols, accordingly.

Figure 3:
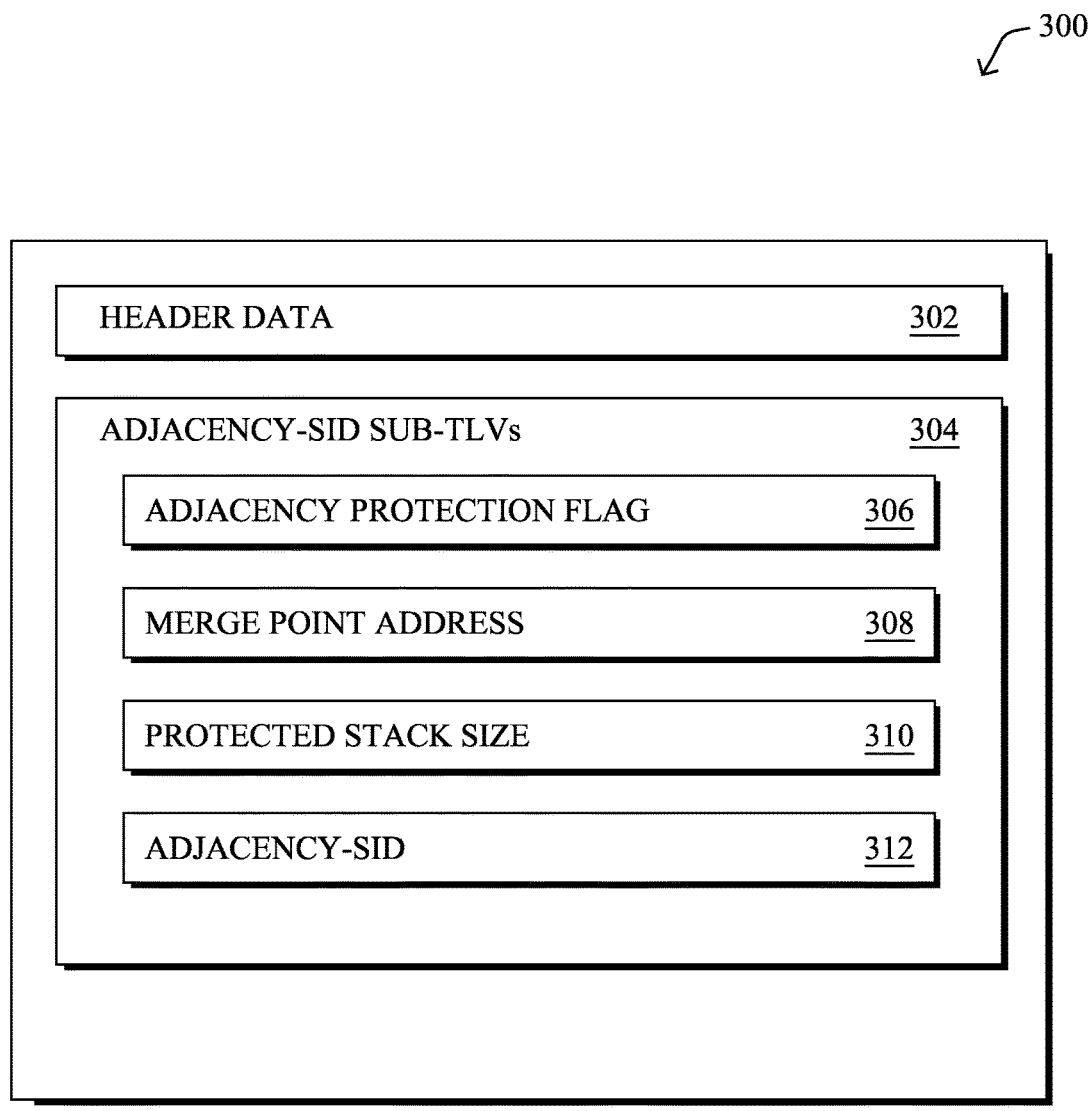
FIG. 3 illustrates an example message that includes an adjacency segment identifier (Adjacency-SID)

Operationally, messages may be promulgated throughout the network and carry additional information regarding adjacency segments for purposes of protecting an adjacency segment against node failure. For example, as shown in FIG. 3, adjacency segment information may be carried within an IGP message 300 (e.g., an IS-IS message, an OSPF message, etc.). IGP message 300 may include header information 302 that may be used to promulgate message 300 throughout the network. In addition, IGP message 300 may include custom Adjacency Segment Identifier (Adjacency-SID) sub-type-length-value (sub-TLVs) 304. Adjacency-SID sub-TLVs may include an Adjacency-SID 312 that identifies a particular adjacency segment in the network. For example, assume that an adjacency segment exists between nodes A and B. In such a case, adjacency-SID 312 may be of the form Adjacency-SID(AB). As would be appreciated, IGP message 300 may also include additional sub-TLVs that are not shown, to advertise link characteristics (e.g., available bandwidth, etc.), such as, e.g., sub-TLVs for IS-IS or OSPF messages for use with MPLS Traffic Engineering (MPLS TE).

According to various embodiments, Adjacency-SID sub-TLVs 304 may be extended to convey any or all of the following information:

An adjacency protection flag 306 that indicates that the adjacency segment is protected against node failure.

A merge point address 308 that indicates where an FRR backup path terminates. In one embodiment, merge point address 308 may be a node-SID (e.g., an identifier associated with a node segment).

A protected stack size 310 that denotes a number of labels that should be popped from the primary segment stack when a failure is detected. Such information may be used, for example, when the backup path includes two or more hops to the merge point (e.g., when the protected path merges with the primary path at any arbitrary number of nodes downstream of the next-hop).

Based on the information included in message 300, a path computation engine (PCE) or head-end node may identify which adjacency segments are protected against downstream node failures. In turn, the PCE or head-end node may select a segment routed path (e.g., node segments and adjacency segments) that is partially or fully protected against link and/or node failures.

Figure 4A:
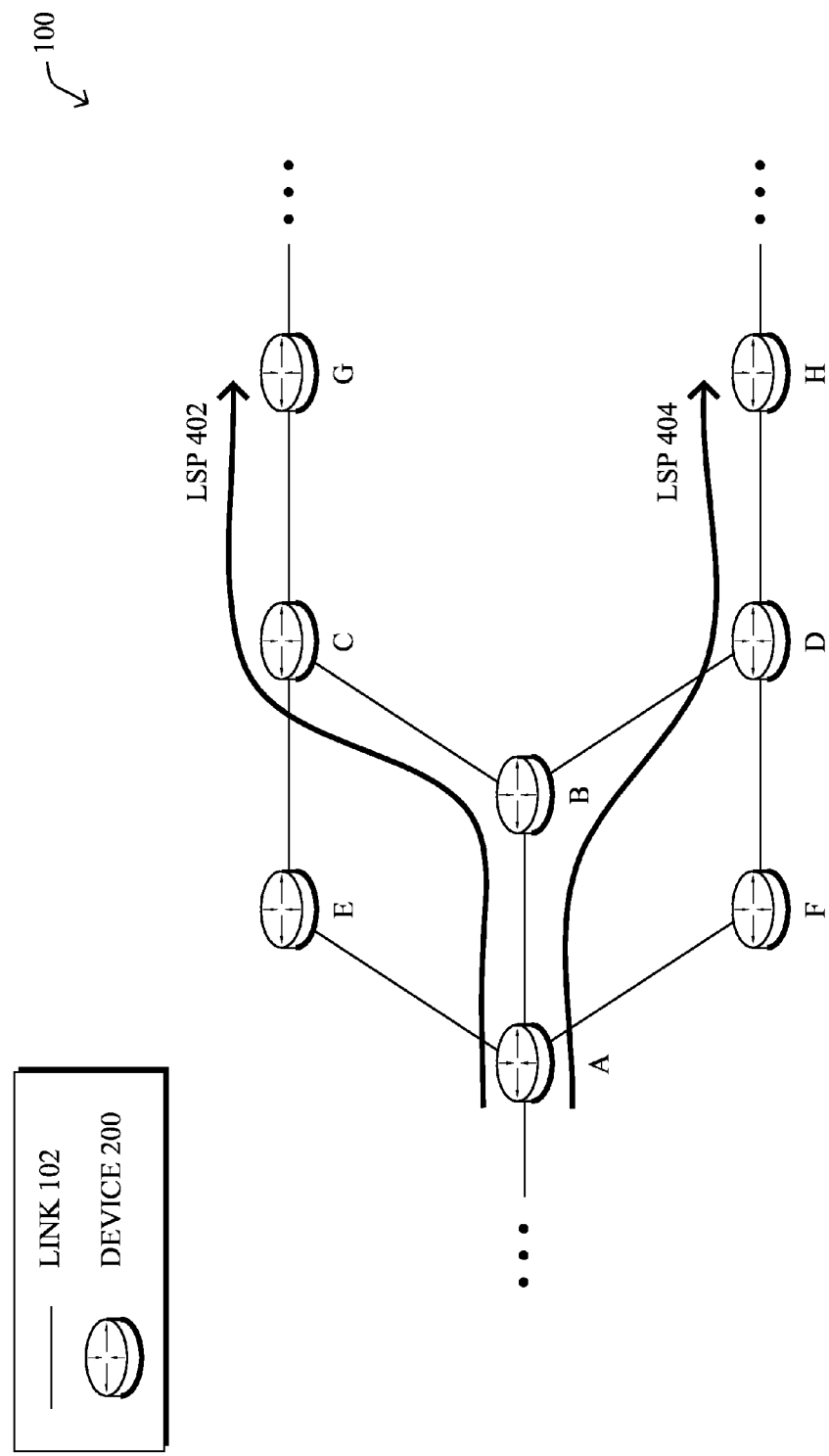
FIGS. 4A-4D illustrate an example of packets traversing network nodes using segment routing.

An example of packets traversing network nodes using segment routing is shown in FIG. 4A, according to various embodiments. As shown, assume that two segment routed, traffic engineered (TE) LSPs 402 and 404 both traverse the adjacency segment between nodes A and B. In such a case, a corresponding segment routed stack for packets of LSP 402 that node A receives may include the following: {Adjacency-SID(AB), Adjacency-SID(BC), Adjacency-SID(CG)}. Similarly, packets of LSP 404 received by node A may include the following segment stack: {Adjacency-SID(AB), Adjacency-SID(BD), Adjacency-SID(DH)}.

During normal routing, node A may "pop" the top label/segment from the stacks of the packets associated with LSPs 402 and 404, and forward the packets to node B. In turn, node B may receive a packet of LSP 402 from node A that includes the following stack: {Adjacency-SID(BC), Adjacency-SID(CG)}, remove the top label from the stack, and forward the packet on to node C. Similarly, node B may receive a packet of LSP 404 from node A that includes the following stack: {Adjacency-SID(BD), Adjacency-SID (DH)}, remove the top label from the stack, and forward the packet on to node D.

Figure 4B:
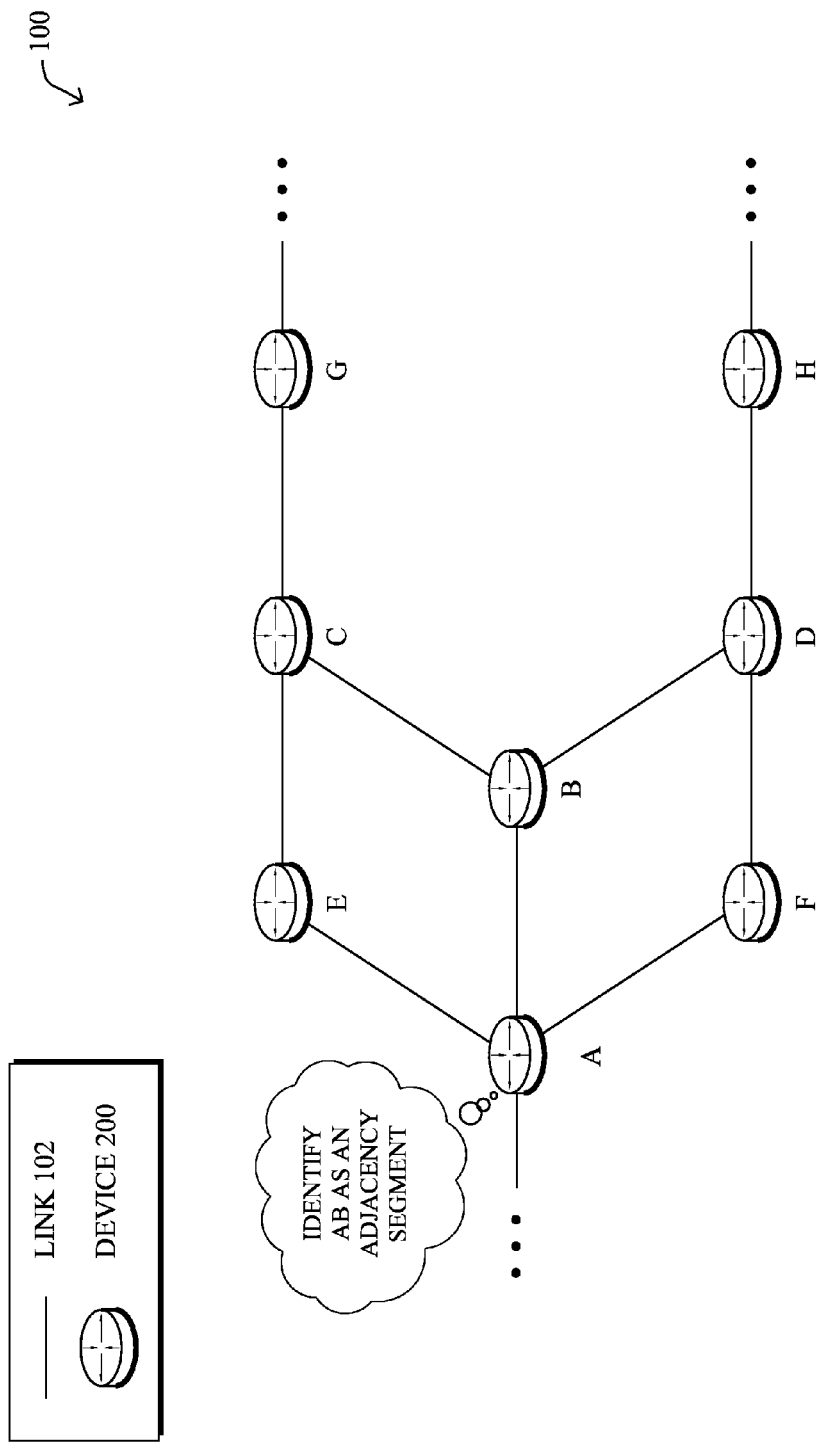
Figure 4C:
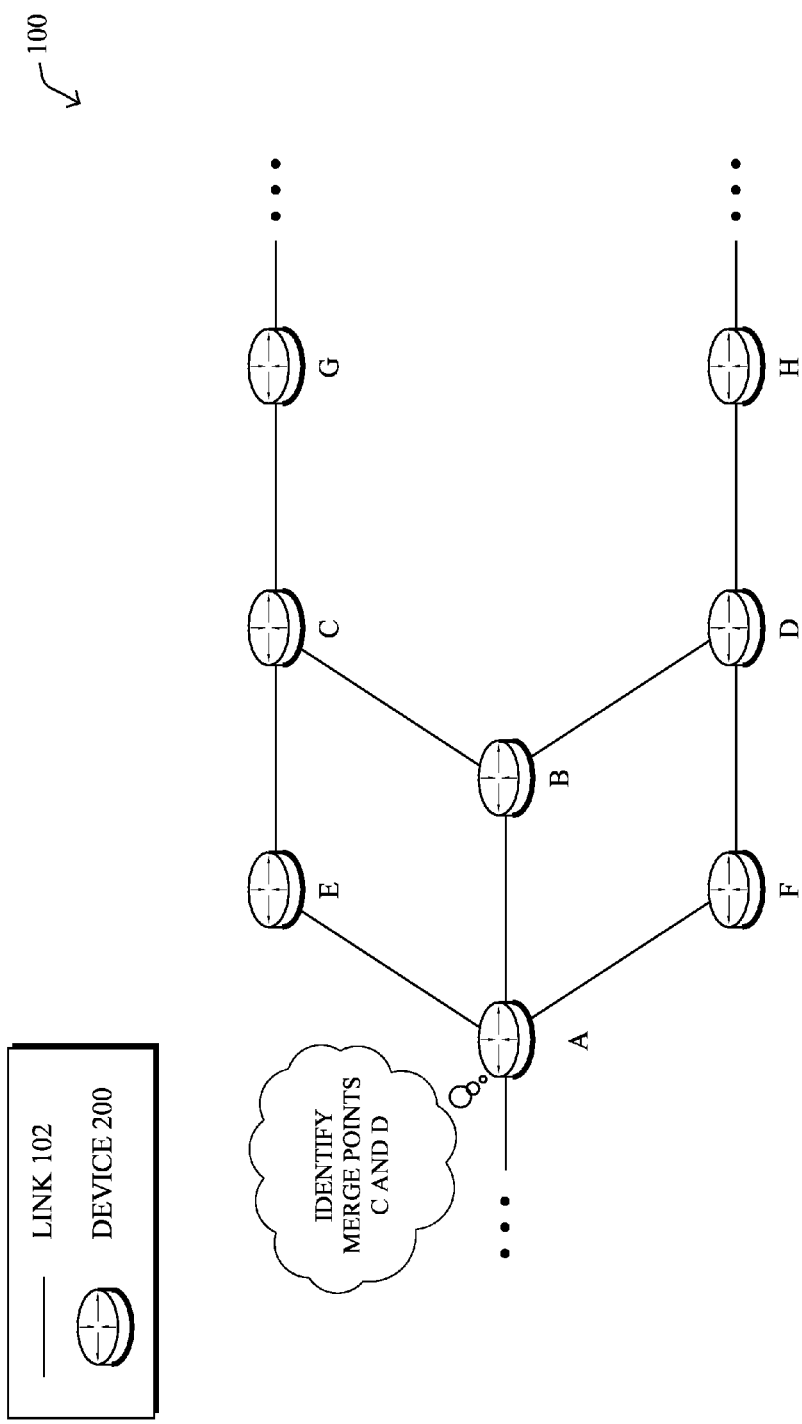
Figure 4D:
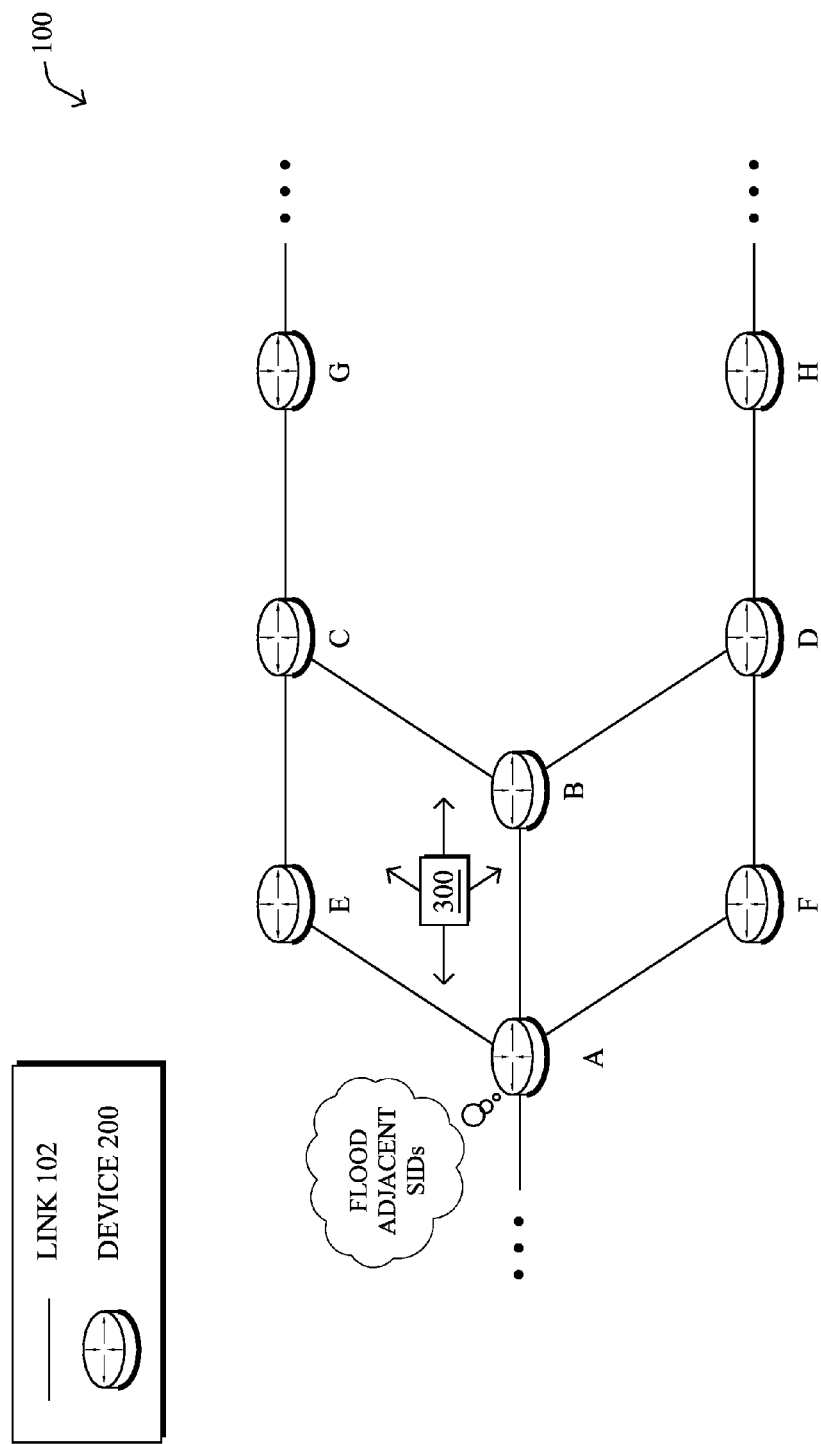

To protect against node failure along adjacency segment AB (e.g., node B fails) for both LSP 402 and LSP 404, node A may be configured as a point of local repair. For example, as shown in FIG. 4B, node A may first identify adjacency segment AB that it shares with node B. In FIG. 4B, node A may then identify node C as a merge point that is downstream of the path that includes adjacency segment AB and runs through node G (e.g., based on received IGP messages). Similarly, node A may also identify node D as a merge point that is downstream of the path that includes adjacency segment AB and runs through node H. As shown in FIG. 4D, node A may generate and flood IGP messages 300 throughout network 100, to notify any PCEs, head-end tunnel nodes, or other interested devices that adjacency segment AB is protected against a node failure at node B.

In some embodiments, if node A supports protecting an adjacency against next-hop node failure, node A may allocate a unique Adjacency-SID for each potential merge point node (e.g., nodes downstream of node B) and include the Adjacency-SID in messages 300. For example, node A may allocate two Adjacency-SIDs for link AB, which is to be protected against a failure at node B. In particular, node A may allocate an Adjacency-SID, Adjacency-SID(AB.1, MP=C) for packets that are forwarded on adjacency/interface AB and have a backup path that terminates at merge point C. Node A may also allocate a second Adjacency-SID, Adjacency-SID(AB.2, MP=D) for packets that are forwarded on adjacency/interface AB and have a backup path that terminates at merge point D. Node A may then include this information in IGP messages 300 within the custom Adjacency-SID Sub-TLV 304 and flood messages 300 throughout the network, allowing a path computation device (e.g., a PCE, tunnel head-end node, etc.) to select protected segments.

Referring now to FIGS. 5A-5D, an example is shown of a fast reroute mechanism for adjacency segments, according to various embodiments. Continuing the example of FIGS. 4A-4D, assume that a PCE or head-end node computes the segment routed path (e.g., node and adjacency segments) for LSP 402 and/or for LSP 404. Such a computation may be based on a determination that the adjacency segments along the paths are protected against next-hop node failures (e.g., as indicated by adjacency protection flag 306, etc.). In such cases, the device that computes LSP 402 and/or LSP 404 may assign the specific adjacency-SIDs whose backup paths terminate at merge points that rejoin the primary LSPs at nodes downstream of the failed node. After computing LSP 402 and/or LSP 404, the device may then begin forwarding packets/traffic 502 along LPS 402 and/or packets/traffic 504 along LSP 404.

Figure 5A:
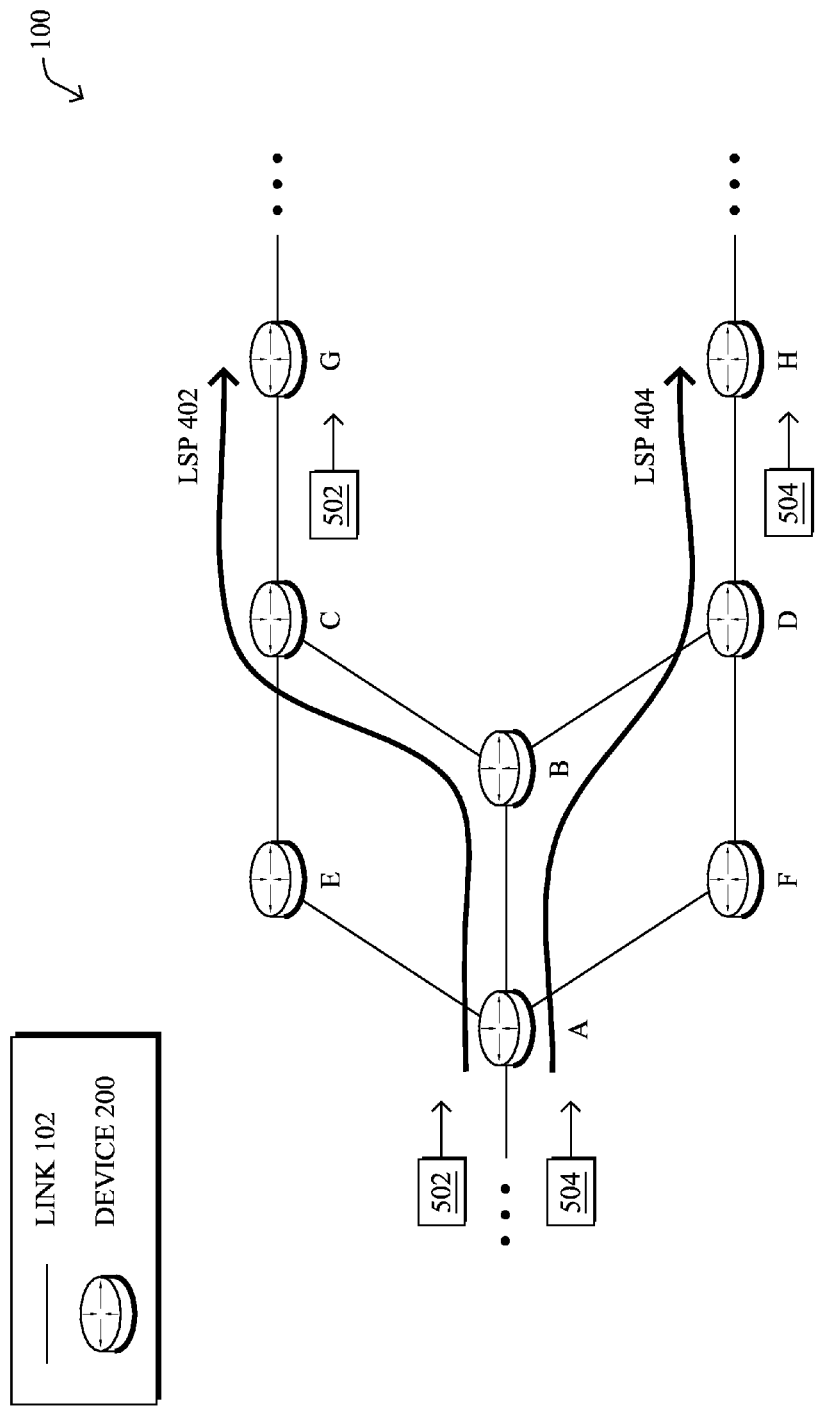
FIGS. 5A-5D illustrate an example of a fast reroute mechanism to protect adjacency segments against node failures.
Figure 5B:
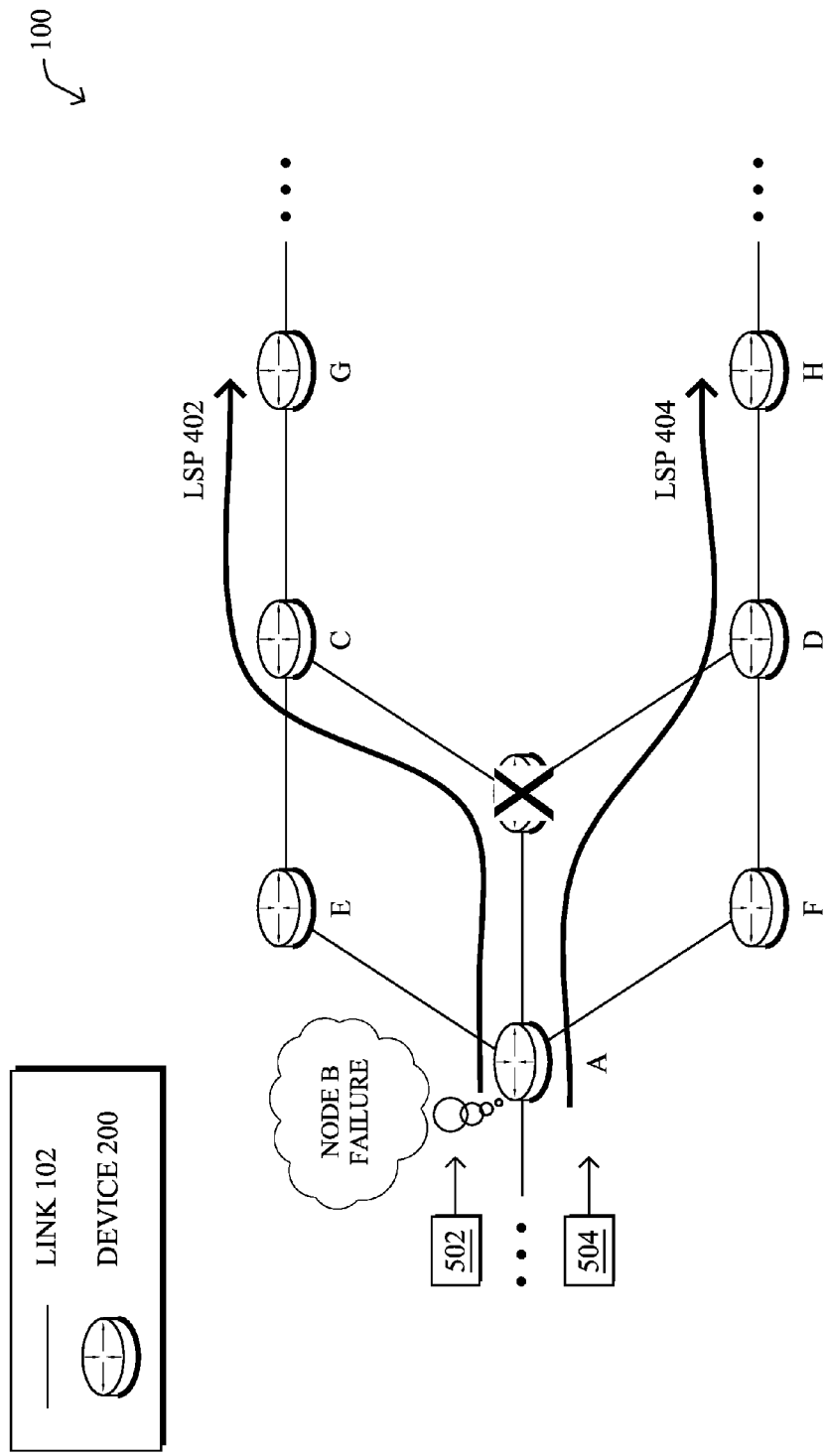

In FIG. 5B, assume that a node failure at node B occurs while traffic 502, 504 is being routed. In such a case, node A may determine that a node failure has occurred at node B and act as a point of local repair. In such a case, node A may impose a backup computed label stack onto packets 502 and 504, before forwarding packets 502 and 504 on to a next-hop node. For example, as described above, node A may have allocated the following Adjacency-SIDs: 1.) Adjacency-SID (AB.1, MP=C) and 2.) Adjacency-SID(AB.2, MP=D), as discussed previously. In various embodiments, node A may pre-compute and pre-program primary and backup paths for these two Adjacency-SIDs, to impose the backup paths on packets/traffic 502, 504, in the event that node B experiences a failure.

Figure 5C:
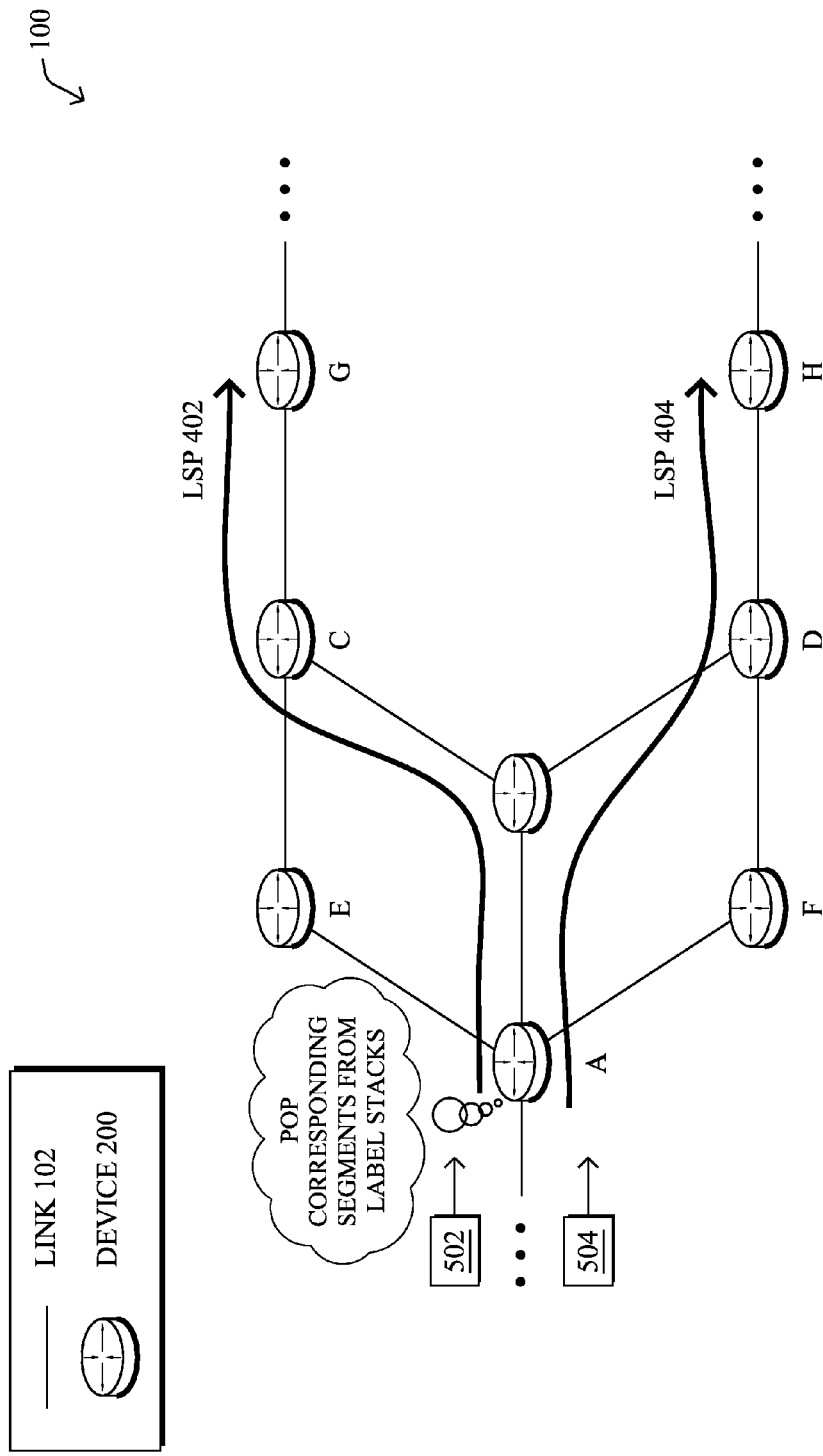

As shown in FIG. 5C, node A may be operable to pop the top n-number of labels from the stacks of packets 502, 504, as part of its FRR mechanism. As shown, node A may pop the top two labels from packets 502, 504 before adding the backup label stacks to the packets. This is done to remove the segments in packets 502, 504 that are affected by the failed node B. In particular, assume that packets 502 received by node A have the following stack: {Adjacency-SID(AB.1), Adjacency-SID(BC), Node-SID(G)}. If node B is experiencing a failure, node A may pop the top two labels from this stack. In other words, node A may remove the Adjacency-SID(AB.1) and Adjacency-SID(BC) labels from the stacks of packets 502. Similarly, assume that packets 504 are received by node A with the following stack: {Adjacency-SID(AB.2), Adjacency-SID(BD), Node-SID(H)}. If node B fails, node A may remove the top two labels from this stack, i.e., Adjacency-SID(AB.2), Adjacency-SID(BD).

In various embodiments, the number of labels removed by a point of local repair may vary, depending on the number of hops between the failing node and the merge point. As shown, for example, merge points C and D are only two hops away from node A. Thus, node A may remove the top two labels from the corresponding stacks, when node B fails. In other cases, however, the merge point may be an arbitrary (e.g., greater than two) number of hops downstream of the failed node. As noted previously, node A may include this hop information in protected stack size 310 of message 300. In some embodiments, the path computing device (e.g., PCE, head-end node, etc.) may use protected stack size 310 to ensure that the primary path from the point of local repair to the merge point contains no more than n-number of segments. Similarly, the point of local repair may use this information to pop the top n-number of labels from its incoming traffic, in the case of a detected node failure.

Figure 5D:
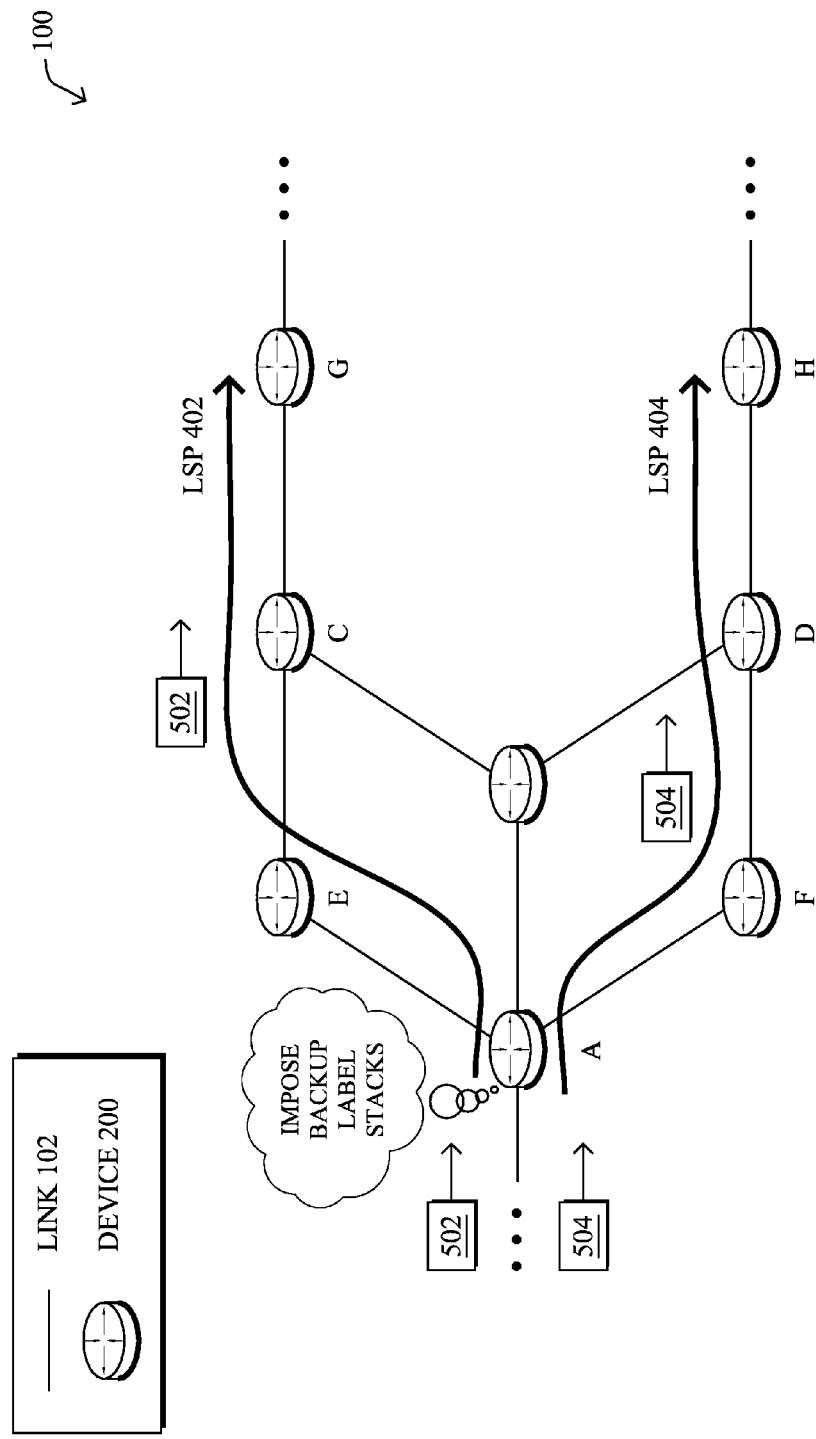

Referring now to FIG. 5D, node A may impose the backup paths onto packets/traffic 502 and 504, after removing the existing labels to the respective merge points. For example, node A may add labels {Node-SID(E), Adjacency-SID(EC)} to packets/traffic 502, resulting in the following stack: {Node-SID(E), Adjacency-SID(EC), Node-SID(G)}. Similarly, for packets/traffic 504, node A may impose the pre-computed backup label stack {Node-SID(F), Adjacency-SID(FD)}, resulting in packets/traffic 504 having the following stack: {Node-SID(F), Adjacency-SID(FD), Node-SID(H)}. Node A may then forward packets/traffic 502 and packets/traffic 504 along their respective backup paths. Thus, node A may reroute traffic 502 along LSP 402 through its backup path (e.g., through node E) and to its merge point C, where it continues on as normal. Similarly, traffic 504 along LSP 404 may be rerouted through node F and merged back to its primary/original path at merge point D.

Figure 6A:
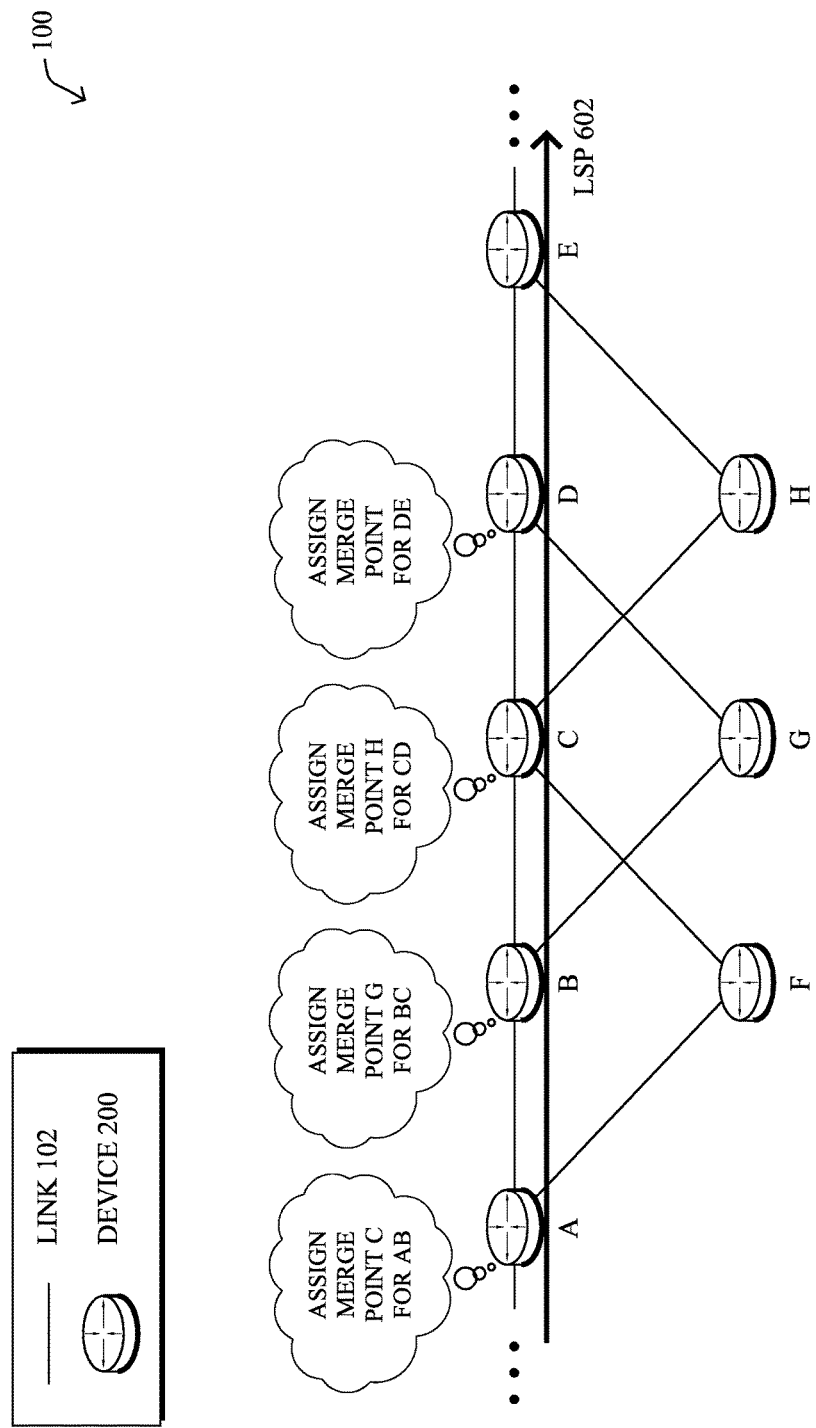
FIGS. 6A-6D illustrate an example of a fast reroute mechanism for nodes traversed by a multi-adjacency segment label switched path (LSP)
Figure 6B:
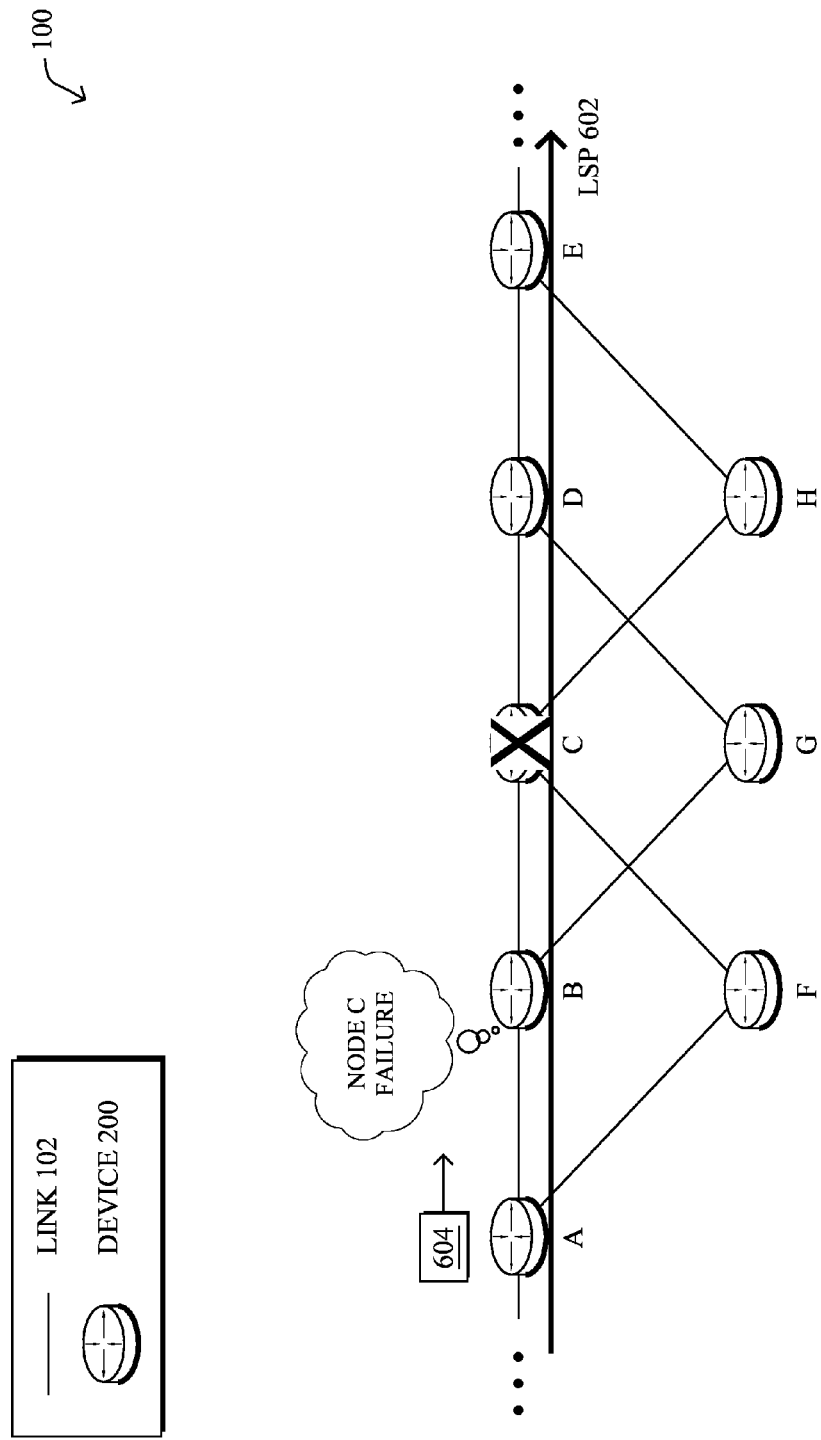

FIGS. 6A-6D illustrate another example of a fast reroute mechanism for nodes traversed by a multi-adjacency segment label switched path (LSP), according to various embodiments. As shown in FIG. 6A, assume that each of nodes A-H is configured to protect their respective adjacency segments against node failure. In such a case, node A may assign and flood Adjacency-SID(AB, MP=C) via IGP messages 300, node B may assign and flood Adjacency-SID (BC, MP=D) via IGP messages 300, node C may assign and flood Adjacency-SID(CD, MP=E), etc. This information may then be used to compute LSP 602 having a strict path of {AB, BC, CD, DE} and requiring node protection along its traversed nodes. Accordingly, as shown in FIG. 6B, packets/traffic 604 associated with LSP 602 received by node A may have the following stack: {Adjacency-SID(AB, MP=C), Adjacency-SID(BC, MP=D), Adjacency-SID(CD, MP=E), Adjacency-SID(DE, MP= . . . )}.

Figure 6C:
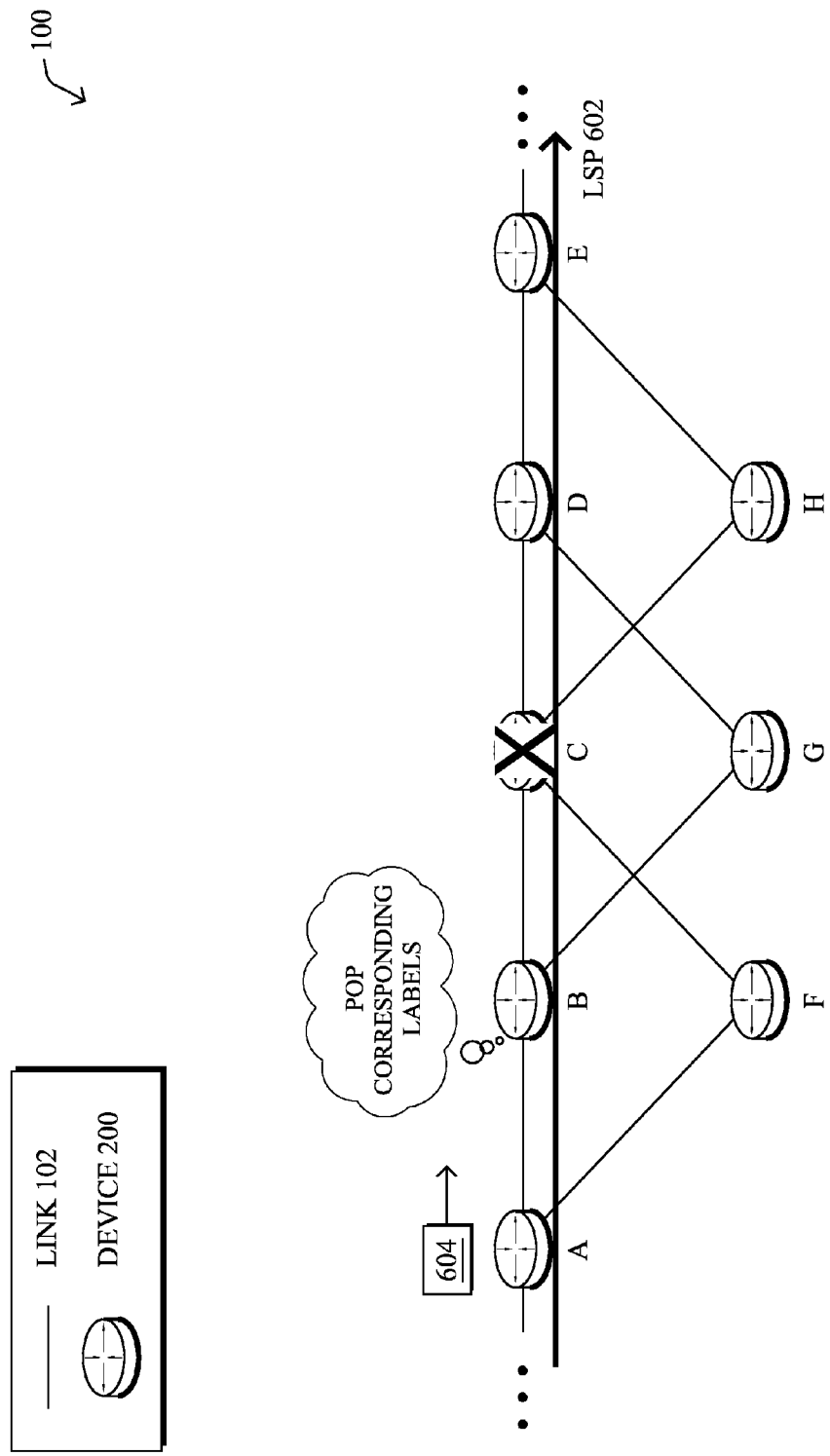
Figure 6D:
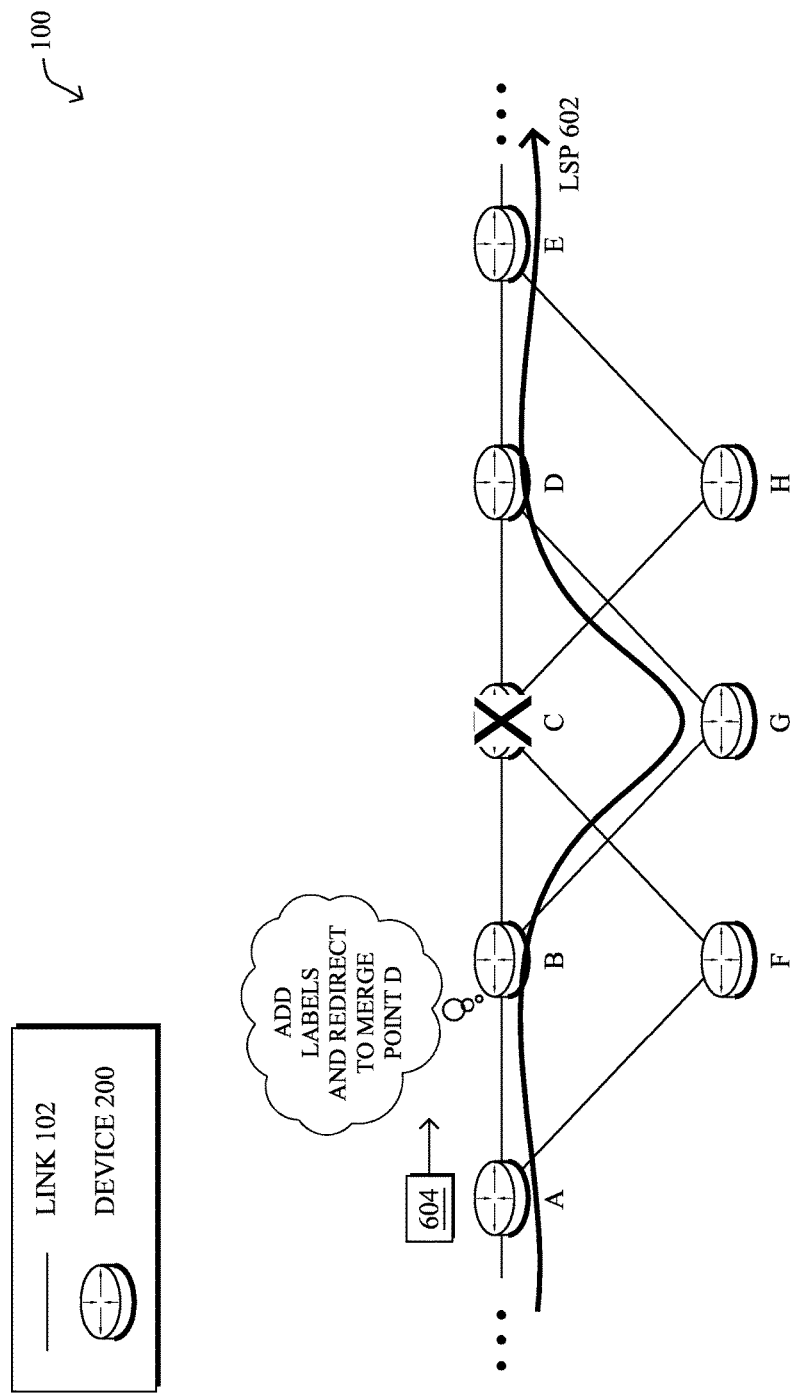

If node C experiences a failure, node B may detect the failure and impose a backup path onto packets/traffic 604, as illustrated in FIGS. 6B-6D. For example, assume that node B receives packets 604 with the following stack: {Adjacency-SID(BC, MP=D), Adjacency-SID(CD, MP=E), Adjacency-SID(DE, MP= . . . )}. As shown in FIG. 6C, node B may pop the Adjacency-SID(BC, MP=D) and Adjacency-SID(CD, MP=E) from the stack of packets/traffic 604. Then, as shown in FIG. 6D, node B may add its pre-computed and pre-programmed labels for the backup path through node G into the stack of packets/traffic 604 and forward on the traffic.

Figure 7:
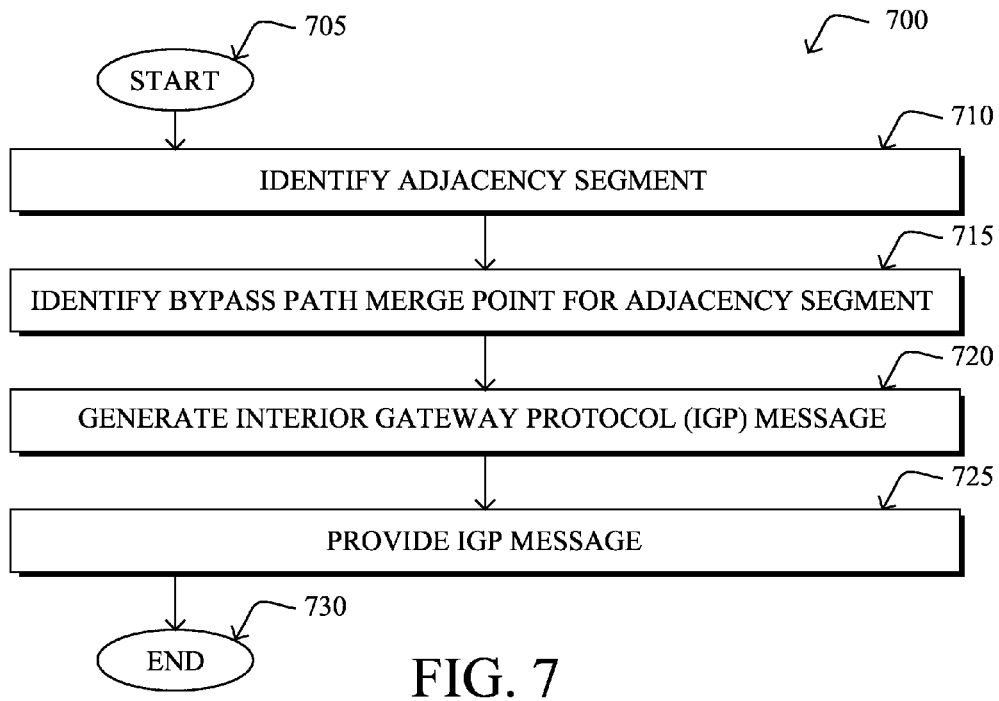
FIG. 7 illustrates an example simplified procedure for providing protection to an adjacency segment against node failure.

FIG. 7 illustrates an example simplified procedure for providing protection against an adjacency segment failure in a network, in accordance with one or more embodiments described herein. The procedure 700 may start at step 705, and continues to step 710, where, as described in greater detail above, a device in a segment routed network identifies an adjacency segment. Such an adjacency segment may correspond to a local link/interface between the device and another device in the network. In contrast to node segments that use uniquely assigned identifiers, an adjacency segment may use an identifier that is local to the device and may not be unique in the network.

At step 715, as described in greater detail above, the device identifies a bypass merge point associated with the adjacency segment. In various embodiments, a network path extends between the device and the merge point via the adjacency segment. For example, as shown in FIG. 4A, a network path A→B→C→G includes the adjacency segment AB and merge point C. In some embodiments, a bypass network path that does not include the adjacency segment may also extend between the device and the merge point. For example, in FIG. 4A, bypass path A→E→C does not include adjacency segment AB and also extends to merge point C. As would be appreciated, a bypass path may be of any length (e.g., greater than two hops).

At step 720, the device generates an interior gateway protocol (IGP) message that identifies the adjacency segment and the merge point, as detailed above. In various embodiments, the device may generate IGP message 300 (e.g., an IS-IS message, an OSPF message, etc.) that includes custom Adjacency-SID Sub-TLVs, which may be used to identify the adjacency segment and the merge point. For example, as shown in FIG. 4D, node A may flood IPG messages 300 that indicate that adjacency segment AB has a merge point at node C. In one embodiment, the generated message may include a flag that indicates that the adjacency segment is protected against node failure (e.g., flag 306). In another embodiment, the protection may be inferred by the inclusion of a merge point address. In some embodiments, the message may also indicate the number of hops or segments between the device and the merge point along the primary network path.

At step 725, the device provides the generated IGP message to one or more other devices in the network, as described in greater detail above. For example, a device that identifies a backup path to protect an adjacency segment against node failure may flood the IGP message generated in step 715 into the network. Such information may be used by a PCE or tunnel head-end to calculate a path that has node failure protection for its adjacency segments. In some cases, the PCE or head-end node may also base the path calculation on the length of the path between a point of local repair and a merge point. For example, the PCE or head-end node may ensure that the primary path from the point of local repair to the merge point contains no more than n-number of nodes (e.g., as indicated in protected stack size 310). Procedure 700 then ends at a step 730.

Figure 8:
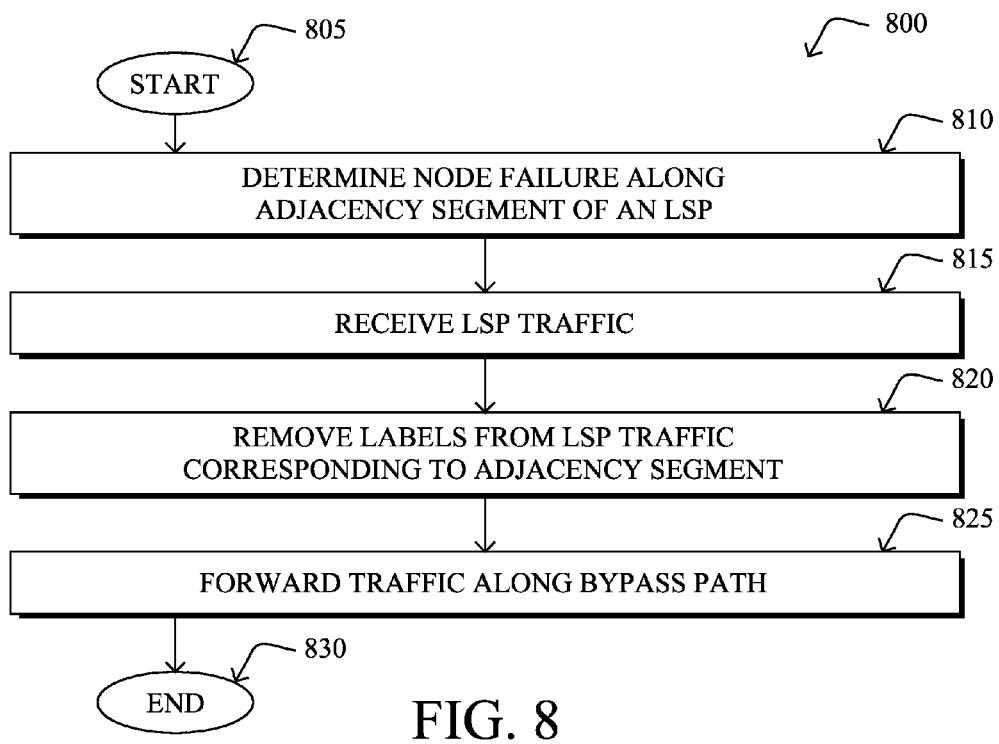
FIG. 8 illustrates an example simplified procedure for rerouting an LSP.

FIG. 8 illustrates an example simplified procedure for rerouting an LSP, according to various embodiments. The procedure 800 may start at step 805, and continues to step 810, where, as described in greater detail above, a device in a segment routed network (e.g., a point of local repair) determines that a node failure has occurred along an adjacency segment of an LSP. For example, as shown in FIG. 5B, node A may determine that node B is experiencing failure, thereby rendering adjacency segment AB unusable.

At step 815, the device receives packets/traffic associated with the LSP, as described in greater detail above. In various embodiments, the stack of the received packets/traffic may include labels for the adjacency segment to the failed node and/or any other segments that are downstream of the failed node. For example, as shown in FIG. 5B, node A may receive traffic 502 associated with LSP 402 that includes a label for the adjacency segment AB.

At step 820, the device removes label(s) in the stack of the received packets/traffic that are associated with the failed adjacency segment, as described in greater detail above. In various embodiments, the device may remove the label for the adjacency segment and any other segments along the LSP to a pre-calculated merge point with a backup path. Such a backup path may bypass the failed node entirely and merge back with the primary path at a merge point downstream of the failed node. For example, as shown in FIG. 5C, node A may remove the labels from packets/traffic 502 that correspond to adjacency segments AB and BC.

At step 825, the device forwards the LSP packets/traffic along the backup path, as described in greater detail above. In various embodiments, the device may impose the backup path onto the packets/traffic by adding the corresponding segment labels to the packets/traffic for the backup path, after removing labels in step 820. For example, as shown in FIG. 5D, node A may add segment labels to packets/traffic 502 that correspond to the backup path A→E→C and forward the packets to node E. Notably, these labels may be pre-computed by node A, thereby allowing for a fast switchover to the backup path, in case of a node failure. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, allow the deployment of segment routed, TE LSPs that traverse strict paths (e.g., over segment routed adjacency segments), to protect the LSP traffic against node failures. Both PCEs and head-end tunnel nodes may use the techniques herein to calculate protected paths. In some aspects, the techniques herein may be employed across all adjacencies or selectively on specific adjacencies based on network policies or configurations.

While there have been shown and described illustrative embodiments that provide for the protection of an adjacency segment against node failure in a segment routed network, it is to be understood that various other adaptations and modifications may be made within the spirit and scope of the embodiments herein. In addition, while certain protocols are shown, such as IS-IS and OSPF, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    identifying, by a device in a segment routed network, an adjacency segment between the device and another device in the segment routed network, wherein the adjacency segment is a local link between the device and the another device in the segment routed network;
    identifying, by the device, a merge point in the segment routed network, wherein a first network path extends between the device and the merge point via the adjacency segment, and wherein a bypass network path that does not include the adjacency segment also extends between the device and the merge point;
    generating, by the device, an interior gateway protocol (IGP) message that includes a custom adjacency segment identifier, the custom adjacency identifier providing an ordered list of adjacency segments and the merge points identified by the device;
    providing, by the device, the IGP message to one or more other devices in the segment routed network;
    determining, by the device, a node failure along the adjacency segment;
    receiving, at the device, traffic associated with a first Link State Protocol (LSP) and a second LSP, wherein the first and second LSPs differ, but both pass through the node failure;
    removing, by the device, adjacency segment labels from the traffic associated with the first LSP and the second LSP;
    forwarding, by the device, the traffic associated with the first LSP along a first backup path to a first merge; and
    forwarding, by the device, the traffic associated with the second LSP along a second backup path to a second merge point, wherein the second backup path differs from the backup path used to forward the traffic associated with the first LSP.

2. The method as in claim 1, wherein the IGP message indicates that the adjacency segment is protected against downstream node failures.

3. The method as in claim 1, wherein the IGP message indicates a number of hops between the device and the merge point along the first network path.

4. The method as in claim 3, wherein the number of hops between the device and the merge point is greater than two hops.

5. The method as in claim 1, wherein forwarding the traffic associated with the first LSP along the bypass network path comprises:
adding, by the device, a label to the traffic that identifies the merge point.

6. An apparatus, comprising:
one or more network interfaces to communicate with a segment routed network;
a processor coupled to the one or more network interfaces and configured to execute one or more processes; and
a memory configured to store a process executable by the processor, the process when executed operable to:
identify an adjacency segment between the apparatus and another device in the segment routed network, wherein the adjacency segment is a local link between the device and the another device in the segment routed network;
identify a merge point in the segment routed network, wherein a first network path extends between the apparatus and the merge point via the adjacency segment, and wherein a bypass network path that does not include the adjacency segment also extends between the device and the merge point;
generate an interior gateway protocol (IGP) message that includes a custom adjacency segment identifier, the custom adjacency identifier providing an ordered list of adjacency segments and the merge points identified by the device;
provide the IGP message to one or more other devices in the segment routed network;
determine a node failure along the adjacency segment;
receive traffic associated with a first Link State Protocol (LSP) and a second LSP, wherein the first and second LSPs differ, but both pass through the node failure;
remove adjacency segment labels from the traffic associated with the first LSP and the second LSP;
forward the traffic associated with the first LSP along a first backup path to a first merge; and
forward the traffic associated with the second LSP along a second backup path to a second merge point, wherein the second backup path differs from the backup path used to forward the traffic associated with the first LSP.

7. The apparatus as in claim 6, wherein the IGP message indicates that the adjacency segment is protected against downstream node failures.

8. The apparatus as in claim 6, wherein the IGP message indicates a number of hops between the device and the merge point along the first network path.

9. The apparatus as in claim 8, wherein the number of hops between the device and the merge point is greater than two hops.

10. The apparatus as in claim 6, wherein the apparatus forwards the traffic associated with the first LSP along the bypass network path by:
adding a label to the traffic that identifies the merge point.

11. A tangible, non-transitory, computer-readable media having software encoded thereon, the software when executed by a processor operable to:
identify, at the first device, an adjacency segment between the first device and another device in a segment routed network, wherein the adjacency segment is a local link between the device and the another device in the segment routed network;
identify, at the first device, a merge point in the segment routed network, wherein a first network path extends between the first device and the merge point via the adjacency segment, and wherein a bypass network path that does not include the adjacency segment also extends between the first device and the merge point;
generate an interior gateway protocol (IGP) message that includes a custom adjacency segment identifier, the custom adjacency identifier providing an ordered list of adjacency segments and the merge points identified by the device;
provide the IGP message to one or more other devices in the segment routed network;
determine a node failure along the adjacency segment;
receive traffic associated with a first Link State Protocol (LSP) and a second LSP, wherein the first and second LSPs differ, but both pass through the node failure;
remove adjacency segment labels from the traffic associated with the first LSP and the second LSP;
forward the traffic associated with the first LSP along a first backup path to a first merge; and
forward the traffic associated with the second LSP along a second backup path to a second merge point, wherein the second backup path differs from the backup path used to forward the traffic associated with the first LSP.

12. The computer-readable media as in claim 11, wherein the IGP message indicates that the adjacency segment is protected against downstream node failures.

13. The computer-readable media as in claim 11, wherein the IGP message indicates a number of hops between the device and the merge point along the first network path.

14. The computer-readable media as in claim 11, wherein the number of hops between the device and the merge point is greater than two hops.

15. The computer-readable media as in claim 11, wherein the software when executed is further operable to:
add a label to the traffic that identifies the merge point.

* * * * *